May 23, 1950     D. VOCISANO     2,508,779

FORM SUPPORT

Filed June 9, 1945

INVENTOR
D. VOCISANO
BY Featherstonhaugh & Co.
ATTORNEYS

Patented May 23, 1950

2,508,779

UNITED STATES PATENT OFFICE 2,508,779

FORM SUPPORT

Domenico Vocisano, Montreal, Quebec, Canada

Application June 9, 1945, Serial No. 598,565

1 Claim. (Cl. 248—357)

This invention relates to supports for beam-molds and other forms used in the construction of reinforced concrete buildings.

More particularly, the invention relates to improvements in telescopic form supports of the type comprising a lower tubular member provided with a screw threaded lower end which is screwed into a threaded socket provided in a supporting base and an upper member slidably arranged in the lower member so that the overall height of the support may be quickly varied by raising or lowering the upper member with reference to the lower member, the upper member being usually supported, in adjusted position, on a supporting pin which is passed through openings provided in opposite wall portions of the lower member. One advantage of this type of telescopic support is that, after major adjustments in the overall height of the support have been obtained by vertical adjustment of the upper member, finer adjustments can then be made by rotating the lower member to screw it into or out of the socket in the base member, whereby the two telescopic members may be raised and lowered as a unit to the exact extent required. However, owing to the conditions under which these supports are used it frequently happens that the engaging screw threads of the lower member and the base socket are fouled or clogged by sand, cement and other foreign materials so that, owing to resulting binding of these parts, it is difficult or impossible to turn the lower tubular member relative to the base member to effect the desired fine adjustment of the overall height of the support.

The object of the present invention is to provide, in a telescopic support of the character described, simple and effective means for preventing the aforesaid binding or jamming of the engaging threaded portions of the lower tubular member and base socket by the clogging action of sand, cement or other foreign material coming in contact therewith.

Other objects, advantages and characteristic features of the invention will be more readily understood from the following detailed description of the accompanying drawings, in which—

Figure 2:
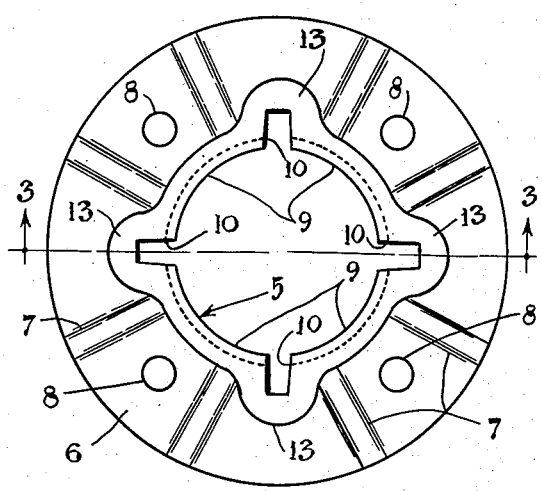
Fig. 2 is a top plan view of the base member of the assembly shown in Fig. 1.
Figure 3:
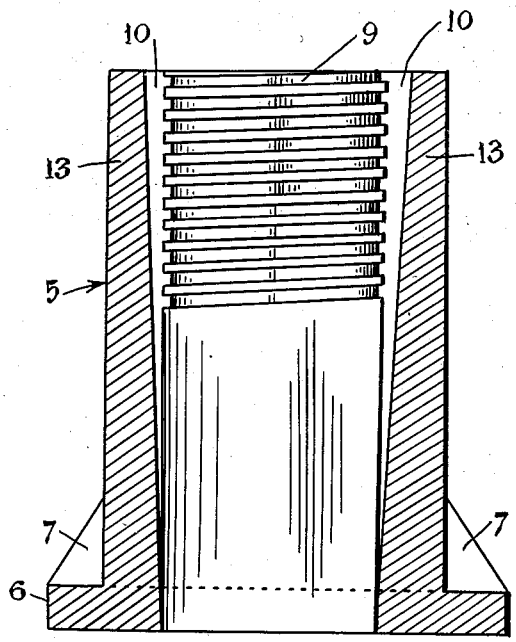
Fig. 3 is a transverse sectional view taken along the line 3—3 of Fig. 2.
Figure 1:
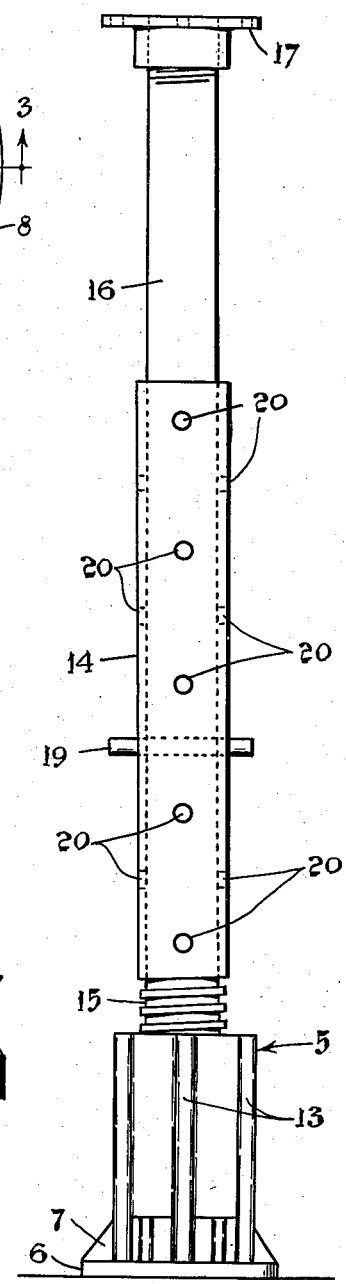
Fig. 1 is a side elevational view of a telescopic form support embodying my invention.

Referring more particularly to the drawings, 5 designates a substantially tubular socket member open at both ends and provided, at its lower end, with an integral outwardly directed attaching flange 6 strengthened by flange reinforcing webs 7. Holes 8 are provided in flange 6 so that fastening members may be passed through these holes to secure the flange to an underlying support. The inner wall of socket 5 is provided with a screw thread 9 and with four equi-distant vertically extending slots 10 interrupting said screw thread. Slots 10 are formed in thickened wall portions 13 of socket 5 so that each slot gradually diminishes in depth from a maximum depth at its upper end to a negligible depth at its lower end.

14 designates a hollow tube provided with a threaded lower end 15 which is screwed into socket 5 so that said tube may be raised or lowered by turning it relative to said socket.

An upper member 16 is slidably supported in tube 14 and is provided, at its upper end, with a form supporting plate 17 adapted to be secured to the bottom of a beam-mold or other type of form used in the construction of reinforced concrete buildings. The upper member 16 is adapted to be raised and lowered with reference to the lower tubular member 14 to thereby vary the overall height of the telescopic support jointly provided by said members. The upper member 16 is supported in adjusted position on a supporting pin 19 which is passed through selected openings 20 of a series of such openings provided in the walls of the lower tubular member. In the present instance the lower tubular member is shown provided with a multiplicity of vertically and horizontally staggered openings arranged so that each opening is located diametrically opposite a similar opening provided in an opposite wall portion of the tube.

In the case of the support described herein the slots 10 of socket member 5 serve dual functions. They provide oil wells in which oil is introduced to lubricate the engaging thread portions of the socket and the tubular member. They also interrupt the thread 9 of the socket so that a self-clearing action of the engaging threads of the socket and the tubular member 14 is obtained when member 14 is rotated relative to said socket. In this connection it may be pointed out, that during rotation of tubular member 14, the ends of those sections of the socket thread 9 which are separated by the slots 10 serve to scrape clogging material accumulating in the grooves between the threads of the tubular member 14 into said slots so that binding and jamming of the thread portions of the socket 5 and member 14 is effectively prevented.

Having thus described what I now consider to be the preferred embodiment of my invention it will be understood that various modifications may be resorted to within the scope and spirit of the invention as defined by the appended claim.

I claim:

In a support of the character described a socket provided with an internally screw threaded upper section of substantial length, a non-threaded lower section continuing from the threaded section to the base of said socket and with circumferentially spaced slots extending substantially the depth of the socket, said slots interrupting the screw thread of said threaded section, the depth of the thread interrupting portion of the slots being greater than the depth of the screw thread.

DOMENICO VOCISANO.

REFERENCES CITED

The following references are of record in the file of this patent:

UNITED STATES PATENTS

| Number | Name | Date |
|---|---|---|
| 753,969 | Fee | Mar. 8, 1904 |
| 906,217 | Gaylord | Dec. 8, 1908 |
| 1,485,572 | Stoltz | Mar. 4, 1924 |

FOREIGN PATENTS

| Number | Country | Date |
|---|---|---|
| 3,392A | Great Britain | of 1897 |
| 732,147 | France | Sept. 13, 1932 |